United States Patent
Kabe

(10) Patent No.: US 9,026,290 B2
(45) Date of Patent: May 5, 2015

(54) DRIVING MODE SWITCH CONTROL DEVICE, HYBRID VEHICLE, DRIVING MODE SWITCH CONTROL METHOD, AND COMPUTER PROGRAM

(75) Inventor: Satoshi Kabe, Tokyo (JP)

(73) Assignee: Hino Motors, Ltd., Tokyo (JP)

( * ) Notice: Subject to any disclaimer, the term of this patent is extended or adjusted under 35 U.S.C. 154(b) by 0 days.

(21) Appl. No.: 13/876,510

(22) PCT Filed: Oct. 20, 2011

(86) PCT No.: PCT/JP2011/074156
§ 371 (c)(1),
(2), (4) Date: Mar. 28, 2013

(87) PCT Pub. No.: WO2012/053591
PCT Pub. Date: Apr. 26, 2012

(65) Prior Publication Data
US 2013/0184922 A1    Jul. 18, 2013

(30) Foreign Application Priority Data

Oct. 21, 2010   (JP) ................................. 2010-236609

(51) Int. Cl.
*B60W 20/00*   (2006.01)
*B60L 11/14*   (2006.01)
(Continued)

(52) U.S. Cl.
CPC ............... *B60W 20/20* (2013.01); *B60L 11/14* (2013.01); *B60L 15/20* (2013.01); *B60L 2210/30* (2013.01); *B60L 2210/40* (2013.01); *B60L 2240/423* (2013.01); *B60L 2260/44* (2013.01); *B60W 2540/10* (2013.01); *B60W 2710/1061* (2013.01); *F02D 29/02* (2013.01); *Y02T 10/642* (2013.01); *Y02T 10/7077* (2013.01); *Y02T 10/7241* (2013.01); *B60K 6/48* (2013.01); *B60K 6/442* (2013.01); *B60W 10/06* (2013.01);
(Continued)

(58) Field of Classification Search
USPC .......................................... 701/22; 180/65.265
See application file for complete search history.

(56) References Cited

U.S. PATENT DOCUMENTS

2007/0227791 A1   10/2007  Ueno
2008/0115986 A1*  5/2008   Rimaux et al. ............... 180/65.2

FOREIGN PATENT DOCUMENTS

CN    101045453 A    10/2007
DE    102007050230 A1   4/2009
(Continued)

OTHER PUBLICATIONS
Jan. 8, 2013 Japanese Office Action, that issued in Japanese Patent Application No. 2012-539761.
(Continued)

*Primary Examiner* — Mary Cheung
*Assistant Examiner* — Yuen Wong
(74) *Attorney, Agent, or Firm* — Cowan, Liebowitz & Latman, P.C.; Mark Montague

(57) ABSTRACT

To reduce the size, weight, and cost of a motor and peripheral devices of the motor. A hybrid automobile is structured in which a required torque is estimated on the basis of an accelerator operation by a driver, and if it is determined that the running by the motor is possible, and an estimation result exceeds a maximum torque of the motor during execution of a running mode by the motor, a mode switch is carried out to a mode in which the automobile runs by an engine or by the engine and the motor in cooperation with each other, even though the running mode by the motor is being executed.

5 Claims, 8 Drawing Sheets

(51) Int. Cl.
  *B60L 15/20* (2006.01)
  *F02D 29/02* (2006.01)
  *B60K 6/48* (2007.10)
  *B60K 6/442* (2007.10)
  *B60W 10/06* (2006.01)
  *B60W 10/08* (2006.01)
  *B60W 10/10* (2012.01)

(52) U.S. Cl.
  CPC .......... *B60W 10/08* (2013.01); *B60W 2600/00* (2013.01); *Y10S 903/93* (2013.01); *B60L 2240/421* (2013.01); *B60L 2240/507* (2013.01); *B60L 2250/26* (2013.01); *B60L 2270/145* (2013.01); *Y02T 10/6221* (2013.01); *Y02T 10/6286* (2013.01); *B60W 10/10* (2013.01); *B60W 2710/1005* (2013.01); *B60W 20/30* (2013.01); *B60W 20/40* (2013.01); *B60W 2710/105* (2013.01); *B60W 20/10* (2013.01)

(56) References Cited

FOREIGN PATENT DOCUMENTS

| | | | |
|---|---|---|---|
| DE | 102008027658 A1 | 12/2009 | |
| DE | 102009000706 A1 | 8/2010 | |
| FR | 2882698 A1 | 9/2006 | |
| JP | 2002-340172 A | 11/2002 | |
| JP | 2003-320859 A | 11/2003 | |
| JP | 2004-003461 A | 1/2004 | |
| JP | 2004-017919 A | 1/2004 | |
| JP | 2005-075048 A | 3/2005 | |
| JP | 2005-163946 A | 6/2005 | |
| JP | 2008-105494 A | 5/2008 | |
| JP | 2009-143501 A | 7/2009 | |
| JP | 2010-089771 A | 4/2010 | |
| JP | 2010-149560 | 7/2010 | |

OTHER PUBLICATIONS

Jul. 2, 2013 Japanese Office Action, that issued in counterpart Japanese Patent Application No. 2012-539761.

International Search Report of the corresponding International Application, PCT/JP2011/074156 dated Dec. 6, 2011.

European Search Report issued on May 16, 2014 that issued in the corresponding European Patent Application No. 11834430.8.

Office Action of the corresponding CN 201180046773.8 application; dated Feb. 4, 2015, which is enclosed with an English Translation.

\* cited by examiner

DRIVING MODE SWITCH CONTROL DEVICE, HYBRID VEHICLE, DRIVING MODE SWITCH CONTROL METHOD, AND COMPUTER PROGRAM

CROSS REFERENCE TO RELATED APPLICATIONS

This is a U.S. national stage of application No. PCT/JP2011/074156, filed on Oct. 20, 2011. Priority under 35 U.S.C. §119(a) and 35 U.S.C. §365(b) is claimed from Japanese Patent Application No. 2010-236609, filed on Oct. 21, 2010, the disclosure of which are also incorporated herein by reference.

TECHNICAL FIELD

The present invention relates to a driving mode switch control device, a hybrid vehicle, a driving mode switch control method, and a computer program.

BACKGROUND ART

A hybrid vehicle capable of running by the cooperation between an engine and an electric motor can run with the electric motor, for example, at the start of moving in which relatively large torque is required. This can reduce the gas emission and the fuel consumption.

In a conventional vehicle, when the State of Charge (SOC) of the battery is equal to or more than a predetermined value, it is determined that the vehicle can be driven by the electric motor. Then, the vehicle runs with the electric motor (for example, see patent literature PTL1).

CITATION LIST

Patent Literature

PTL1 JP 2005-24049 A

SUMMARY OF INVENTION

Technical Problem

In the conventional hybrid vehicle, as described above, it is determined based on the SOC of the battery whether the vehicle can run with the electric motor. When it is determined that the vehicle can run with the electric motor, a driving mode with the electric motor is selected. In such a driving mode with the electric motor, it is required that the electric motor has the same driving performance as the engine. Thus, the electric motor and a peripheral device such as an inverter need to secure torque enough not to affect the running in which the electric motor solely operates. In other words, conventional electric motor and peripheral device such as an inverter need to generate the same amount of torque as the engine. This causes the electric motor and the electric motor peripheral device of a conventional hybrid vehicle to become larger and heavier. Furthermore, this also causes the high cost.

In light of the foregoing, an objective of the present invention is to provide a driving mode switch control device, a hybrid vehicle, a driving mode switch control method, and a computer program that can reduce the size, weight, and cost of an electric motor and an electric motor peripheral device.

Solution to Problem

An aspect of the present invention is directed to a driving mode switch control device. According to the present invention, the driving mode switch control device of a hybrid vehicle that includes an engine and an electric motor and that is capable of running by the engine or the electric motor or capable of running by a cooperation between the engine and the electric motor, includes:

request torque estimation means for estimating request torque based on a driver's accelerator operation; and mode switch means for, when it is determined that the vehicle can run with the electric motor and an estimation result from the request torque estimation means exceeds maximum torque of the electric motor during implementation of a driving mode with the electric motor, performing a mode switch to a mode in which the vehicle runs with the engine or by the cooperation between the engine and the electric motor in spite of implementing the driving mode with the electric motor.

Further, the mode switch means can perform a mode switch at a next gear shifting timing even if the estimation result from the request torque estimation means does not exceed the maximum torque of the electric motor during acceleration in the driving mode with the electric motor.

Further, the mode switch means can control a rotational speed of the engine to be faster than a rotational speed of the electric motor when performing the switch from the driving mode with the electric motor to the mode in which the vehicle runs with the engine or by the cooperation between the engine and the electric motor.

For example, the request torque estimation means determines whether a variation of accelerator opening amount according to the driver's accelerator operation or accelerator opening amount exceeds a predetermined value.

A further aspect of the present invention is directed to a hybrid vehicle. The hybrid vehicle according to the present invention includes the driving mode switch control device according to the present invention.

A further aspect of the present invention is directed to a driving mode switch control method. According to the present invention, the driving mode switch control method of a hybrid vehicle that includes an engine and an electric motor and that is capable of running by the engine or the electric motor or capable of running by a cooperation between the engine and the electric motor, includes:

a request torque estimation step for estimating request torque based on a driver's accelerator operation; and a mode switch step for, when it is determined that the vehicle can run with the electric motor and an estimation result from a process by the request torque estimation step exceeds maximum torque of the electric motor during implementation of a driving mode with the electric motor, performing a mode switch to a mode in which the vehicle runs with the engine or by the cooperation between the engine and the electric motor in spite of implementing the driving mode with the electric motor.

A further aspect of the present invention relates to a computer program. The computer program according to the present invention causes an information processing apparatus to implement a function of the driving mode switch control device according to the present invention.

Advantageous Effects of Invention

The present invention can reduce the size, weight, and cost of an electric motor and an electric motor peripheral device of a hybrid vehicle.

DESCRIPTION OF EMBODIMENTS

First Embodiment

Hereinafter, the hybrid vehicle according to the first embodiment of the present invention will be described with reference to FIGS. 1 to 4.

Figure 1:
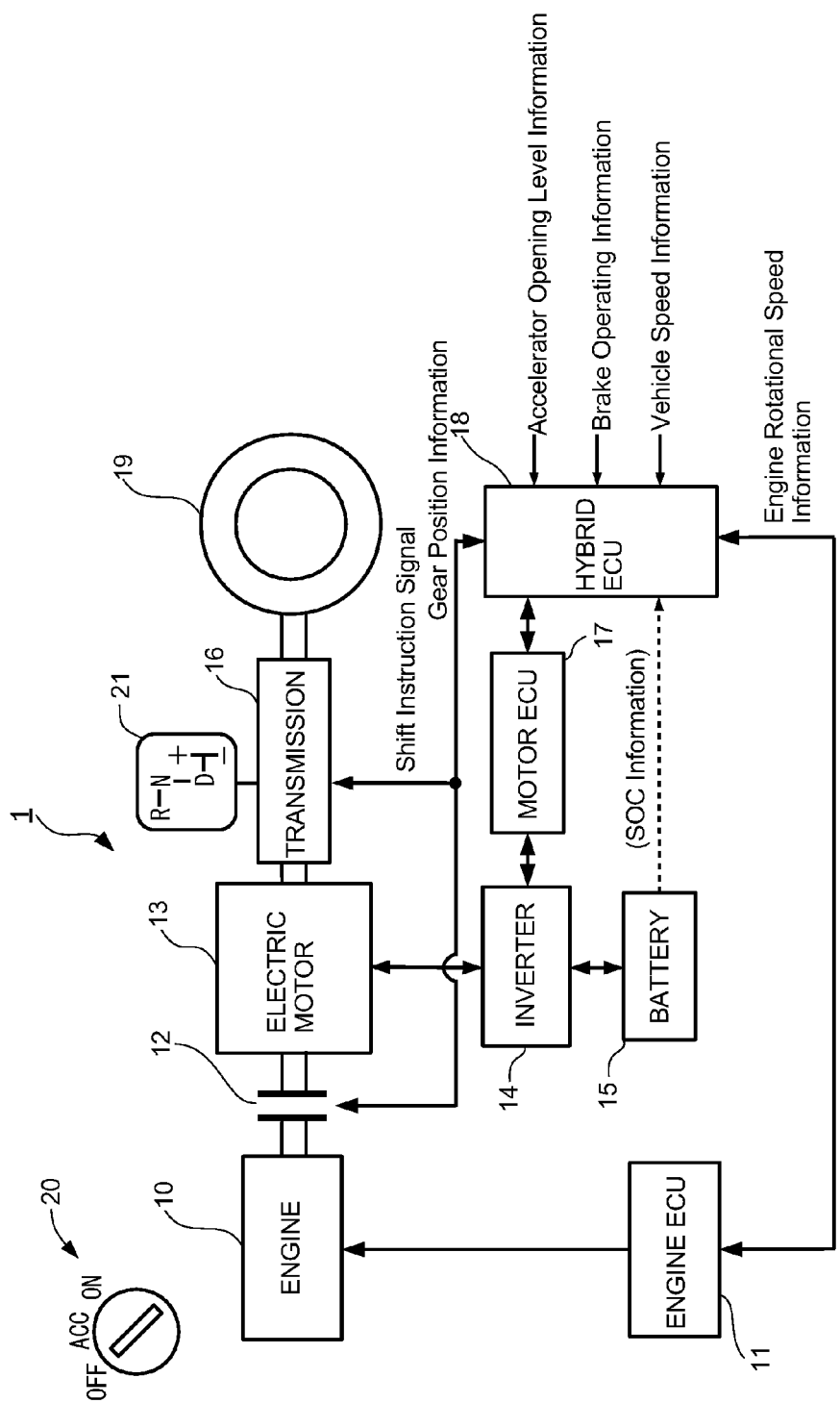
FIG. 1 is a block diagram for illustrating an exemplary structure of a hybrid vehicle according to a first embodiment.

FIG. 1 is a block diagram for illustrating an exemplary structure of a hybrid vehicle 1. The hybrid vehicle 1 is an example of a vehicle.

The hybrid vehicle 1 includes the engine 10, an engine Electronic Control Unit (ECU) 11, a clutch 12, the electric motor 13, an inverter 14, a battery 15, a transmission 16, a motor ECU 17, a hybrid ECU 18, a wheel 19, a key switch 20, and a shift unit 21. Note that the transmission 16 includes an automated mechanical/manual transmission, and is operated by the shift unit 21 including a drive range (hereinafter, referred to as a D (Drive) range). In that case, the automated mechanical/manual transmission is a transmission that can automatically perform a gear shifting operation while having the same structure as a manual transmission.

The engine 10 is an example of an internal combustion engine, and is controlled by the engine ECU 11. The engine 10 internally combusts gasoline, light oil, Compressed Natural Gas (CNG), Liquefied Petroleum Gas (LPG), alternative fuel, or the like in order to generate power for rotating a shaft and transmit the generated power to the clutch 12.

The engine ECU 11 is a computer working in coordination with the motor ECU 17 according to the instructions from the hybrid ECU 18, and controls the engine 10, for example, the amount of fuel injection and the valve timing. For example, the engine ECU 11 includes a Central Processing Unit (CPU), an Application Specific Integrated Circuit (ASIC), a microprocessor (micro-computer), a Digital Signal Processor (DSP), and the like, and internally has an operation unit, a memory, an Input/Output (I/O) port, and the like.

The clutch 12 is controlled by the hybrid ECU 18, and transmits the shaft output from the engine 10 to the wheel 19 through the electric motor 13 and the transmission 16. In other words, the clutch 12 mechanically connects the rotating shaft of the engine 10 to the rotating shaft of the electric motor 13 by the control of the hybrid ECU 18 in order to transmit the shaft output of the engine 10 to the electric motor 13. On the other hand, the clutch 12 cuts the mechanical connection between the rotating shaft of the engine 10 and the rotating shaft of the electric motor 13 so that the shaft of the engine 10 and the rotating shaft of the electric motor 13 can rotate at different rotational speeds from each other.

For example, the clutch 12 mechanically connects the rotating shaft of the engine 10 to the rotating shaft of the electric motor 13, for example, when the hybrid vehicle 1 runs by the power of the engine 10 and this causes the electric motor 13 to generate electric power, when the driving force of the electric motor 13 assists the engine 10, and when the electric motor 13 starts the engine 10.

Further, for example, the clutch 12 cuts the mechanical connection between the rotating shaft of the engine 10 and the rotating shaft of the electric motor 13 when the engine 10 is stopping or is in an idling state and the hybrid vehicle 1 runs by the driving force of the electric motor 13, and when the hybrid vehicle 1 reduces the speed or runs on the downgrade and the electric motor 13 generates (regenerates) electric power while the engine 10 is stopping or is in an idling state.

Note that the clutch 12 differs from a clutch operated by the driver's operation of a clutch pedal, and is operated by the control of the hybrid ECU 18.

The electric motor 13 is a so-called motor generator that supplies a shaft output to the transmission 16 by generating the power for rotating the shaft using the electric power supplied from the inverter 14, or that supplies electric power to the inverter 14 by generating the electric power using the power for rotating the shaft supplied from the transmission 16. For example, when the hybrid vehicle 1 gains the speed or runs at a constant speed, the electric motor 13 generates the power for rotating the shaft to supply the shaft output to the transmission 16 in order to cause the hybrid vehicle 1 to run in cooperation with the engine 10. Further, the electric motor 13 works as an electric generator, for example, when the electric motor 13 is driven by the engine 10, or when the hybrid vehicle 1 runs without power, for example, when the hybrid vehicle 1 reduces the speed or runs on the downgrade. In that case, electric power is generated by the power for rotating the shaft supplied from the transmission 16 and is supplied to the inverter 14 in order to charge the battery 15.

The inverter 14 is controlled by the motor ECU 17, and converts the direct voltage from the battery 15 into an alternating voltage or converts the alternating voltage from the electric motor 13 into a direct voltage. When the electric motor 13 generates power, the inverter 14 converts the direct voltage from the battery 15 into an alternating voltage and supplies the electric power to the electric motor 13. When the electric motor 13 generates electric power, the inverter 14 converts the alternating voltage from the electric motor 13 into a direct voltage. In other words, in that case, the inverter 14 works as a rectifier and a voltage regulator for supplying a direct voltage to the battery 15.

The battery 15 is a secondary cell capable of being charged and discharged. The battery 15 supplies electric power to the electric motor 13 through the inverter 14 when the electric motor 13 generates power. Alternatively, the battery 15 is charged with the electric power generated by the electric motor 13 when the electric motor 13 generates electric power.

The transmission 16 includes an automated mechanical/manual transmission (not shown in the drawings) that selects one of a plurality of gear ratios (change gear ratios) according to the shift instruction signal to shift gears from the hybrid ECU 18 in order to shift the change gear ratios and transmit the gear-shifted power of the engine 10 and/or of the electric motor 13 to the wheel 19. Alternatively, the transmission 16 transmits the power from the wheel 19 to the electric motor 13, for example, when the vehicle reduces the speed or runs on the downgrade. Note that the automated mechanical/ manual transmission can also shift the gear position to a given gear number by the driver's hand operation of the shift unit 21.

The motor ECU 17 is a computer working in coordination with the engine ECU 11 according to the instructions from the hybrid ECU 18, and controls the electric motor 13 by controlling the inverter 14. For example, the motor ECU 17 includes a CPU, an ASIC, a microprocessor (micro-computer), a DSP, and the like, and internally has an operation unit, a memory, an I/O port, and the like.

The hybrid ECU 18 is an example of a computer. For hybrid running, the hybrid ECU 18 obtains accelerator opening amount information, brake operation information, vehicle speed information, the gear position information obtained from the transmission 16, and the engine rotational speed information obtained from the engine ECU 11 in order to refer to the information, control the clutch 12 and supply the shift instruction signal to shift gears in order to control the transmission 16. For hybrid running, the hybrid ECU 18 further gives the instructions to the motor ECU 17 to control the electric motor 13 and the inverter 14 based on the obtained SOC information on the battery 15 and other information, and gives the instruction to the engine ECU 11 to control the engine 10. For example, the hybrid ECU 18 includes a CPU, an ASIC, a microprocessor (micro-computer), a DSP, and the like, and internally has an operation unit, a memory, an I/O port, and the like.

Note that a computer program to be executed by the hybrid ECU 18 can be installed on the hybrid ECU 18 that is a computer in advance by being stored in a non-volatile memory inside the hybrid ECU 18 in advance.

The engine ECU 11, the motor ECU 17, and the hybrid ECU 18 are connected to each other, for example, through a bus complying with the standard of the Control Area Network (CAN) or the like.

The wheel 19 is a drive wheel for transmitting the driving force to the road surface. Note that, although only a wheel 19 is illustrated in FIG. 1, the hybrid vehicle 1 actually includes a plurality of the wheels 19.

The key switch 20 is a switch that is turned ON/OFF, for example, by insertion of a key by the user at the start of drive. Turning ON the key switch 20 activates each unit of the hybrid vehicle 1, and turning OFF the key switch 20 stops each unit of the hybrid vehicle 1.

Figure 2:
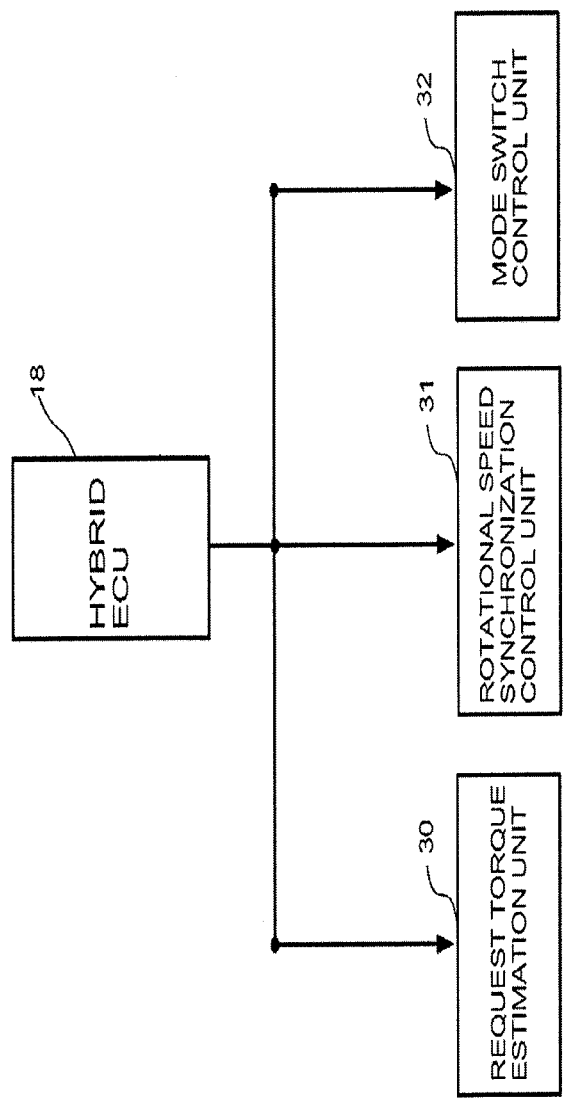
FIG. 2 is a block diagram for illustrating an exemplary configuration of a function implemented in a hybrid ECU illustrated in FIG. 1.

FIG. 2 is a block diagram for illustrating an exemplary configuration of a function implemented in the hybrid ECU 18 executing a computer program. In other words, when the hybrid ECU 18 executes a computer program, a request torque estimation unit 30, a rotational speed synchronization control unit 31, and a mode switch control unit 32 are implemented.

The request torque estimation unit 30 obtains the information on the opening amount of the accelerator operated by the driver from an accelerator opening amount sensor (not illustrated in the drawings), and estimates the driver's request torque based on the obtained accelerator opening amount information.

When the clutch 12 is engaged, the rotational speed synchronization control unit 31 controls the rotational speeds of the engine 10 and the electric motor 13 to almost synchronize with each other.

The mode switch control unit 32 controls the switch among an electric motor driving mode in which the vehicle runs with the electric motor 13, an engine driving mode in which the vehicle runs with the engine 10, and an assistance driving mode in which the vehicle runs while the electric motor 13 assists the engine 10.

The electric motor driving mode is usually used when the vehicle starts moving (when a 2nd gear is selected) so that the exhaust gas from the engine 10 at the start of moving can be eliminated and the fuel efficiency can be improved. At that time, the clutch 12 is in a disengaged state.

The engine driving mode is usually used when the vehicle runs (when a 3rd or a 4th gear is selected). Further, at that time, the clutch 12 is in an engaged state and the electric motor 13 regenerates electric power with the output from the engine 10 or, if the SOC of the battery 15 is high, the electric motor 13 is free from the engine 10 in order not to add friction to the engine 10.

The assistance driving mode is usually used when the maximum torque of the electric motor 13 is not sufficient for the vehicle to start moving or to run. At that time, the clutch 12 is in the engaged state and both of the engine 10 and the electric motor 13 produce outputs.

Figure 3:
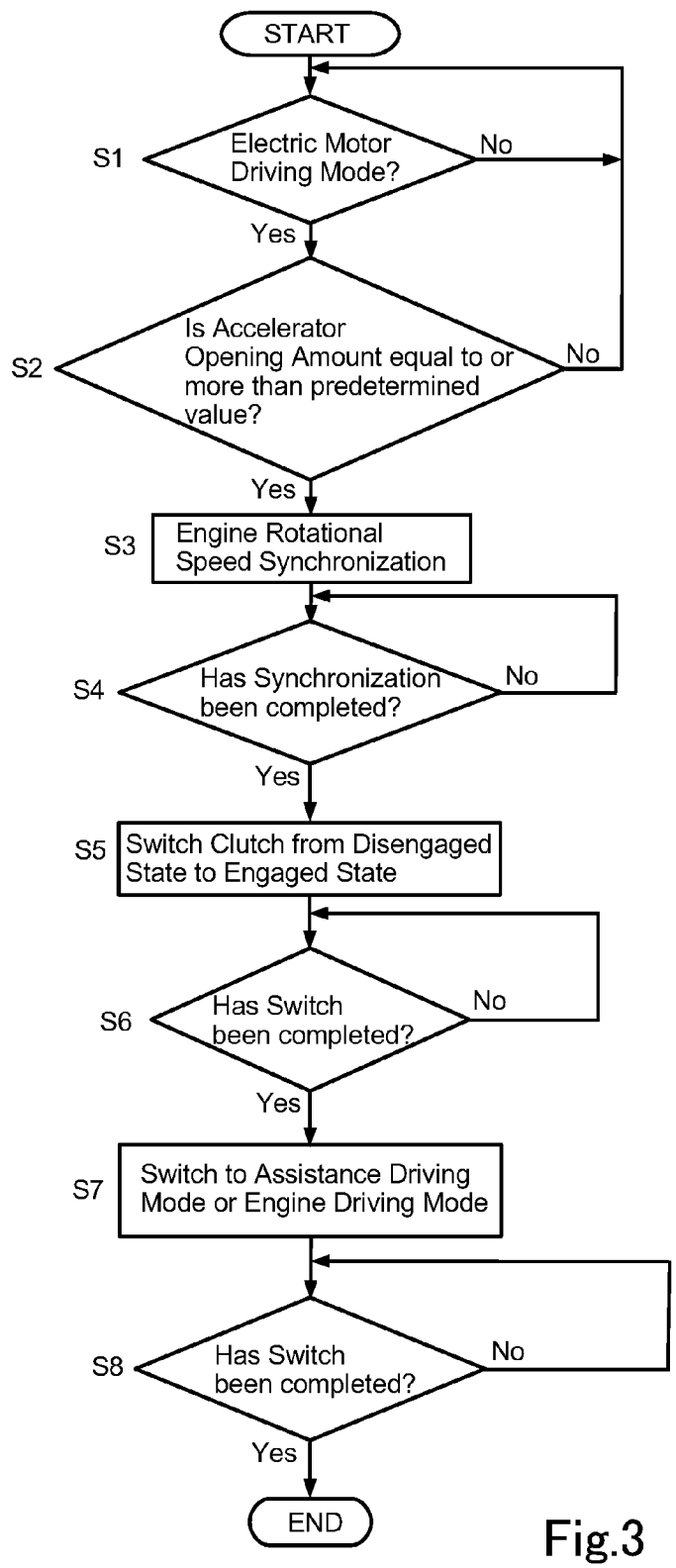
FIG. 3 is a flowchart for illustrating a mode switch process by a mode switch control unit illustrated in FIG. 2.

Next, the process for a mode switch control implemented in the hybrid ECU 18 executing a computer program will be described with reference to the flowchart in FIG. 3 and the timing diagram in FIG. 4. Note that the process for a mode switch control illustrated in the flowchart of FIG. 3 is a cycle of the process, and the process is repeatedly performed when the key switch 20 of the hybrid vehicle 1 is in the ON state.

At the START, the key switch 20 of the hybrid vehicle 1 is in the ON state. The hybrid ECU 18 has executed a computer program and the request torque estimation unit 30, the rotational speed synchronization control unit 31, and the mode switch control unit 32 are implemented in the hybrid ECU 18. Then, the process goes to step S1.

In step S1, the mode switch control unit 32 determines whether the current mode is the electric motor driving mode. For example, when the 2nd gear is selected, the electric motor driving mode is selected. Note that when the vehicle starts moving, the 2nd gear is selected. As the rotational speed increases, the gear is shifted up into the 3rd gear and the 4th gear. When it is determined in step S1 that the electric motor driving mode is currently selected, the process goes to step S2. On the other hand, when it is determined in step S1 that the electric motor driving mode is not currently selected, the process of step S1 is repeated.

In step S2, the request torque estimation unit 30 determines whether the accelerator opening amount is equal to or more than a predetermined value. At that time, determining whether the accelerator opening amount is equal to or more than a predetermined value is for determining whether the generation of torque equal to or more than the predetermined value is requested while the vehicle runs in the electric motor driving mode. The torque equal to or more than the predetermined value, for example, means the maximum torque that can be generated by the electric motor 13.

In step S2, when the accelerator opening is equal to or more than the predetermined value (in other words, when the generation of torque exceeding the maximum torque that can be generated by the electric motor 13 is requested while the vehicle runs in the electric motor driving mode), the process goes to step S3. On the other hand, when it is determined in step S2 that the accelerator opening amount is less than the predetermined value, the process goes back to step S1.

In step S3, the rotational speed synchronization control unit 31 starts a synchronization control in order to almost synchronize the rotational speed of the engine 10 and the rotational speed of the electric motor 13.

In step S4, the rotational speed synchronization control unit 31 is on standby until the synchronization of the rotational speed of the engine 10 and the rotational speed of the electric motor 13 is completed. When the synchronization is completed, the rotational speed synchronization control unit 31 provides notification of the fact to the mode switch control unit 32. Then, the process goes to step S5.

In step S5, the mode switch control unit 32 starts the process for switching the clutch 12 from the disengaged state in the electric motor driving mode to the engaged state.

In step S6, the mode switch control unit 32 is on standby until the engagement of the clutch 12 is completed. When the engagement of the clutch 12 is completed, the process goes to step S7.

In step S7, the mode switch control unit 32 starts the switch to the assistance driving mode or the engine driving mode. For example, when the mode is switched to the engine driving mode, the power of the engine 10 is transmitted to a tire 20 through the clutch 12 that has been engaged in the process of step S6. When the mode is switched to the assistance driving mode, the power of the engine 10 is added to the power of the electric motor 13 and is transmitted to the tire 20.

In step S8, the mode switch control unit 32 is on standby until the switch of the mode is completed. When the switch of the mode is completed, the mode switch control unit 32 completes the mode switch control. After that, the process goes back to step S1 at a predetermined timing and the same process is performed.

Figure 4:
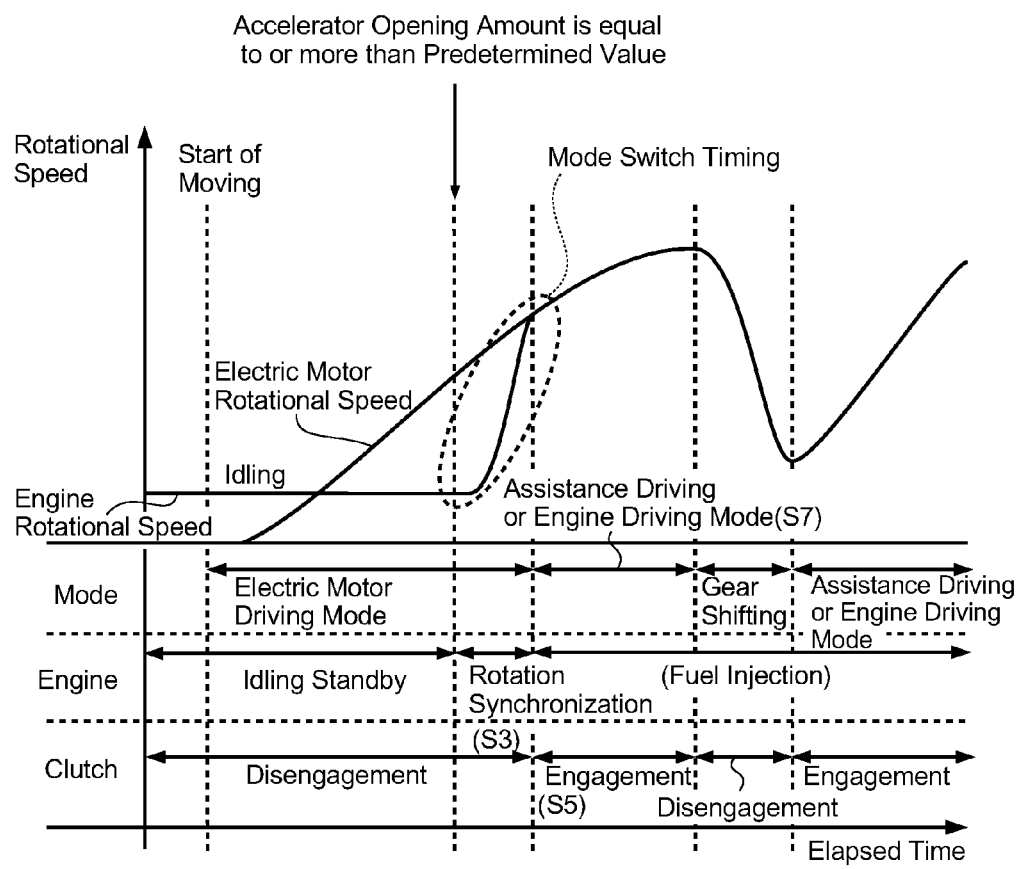
FIG. 4 is a timing diagram for illustrating the mode switch process of the mode switch control unit illustrated in FIG. 2.

FIG. 4 is a view for illustrating the timings of step S3 (rotation synchronization), step S5 (engage clutch), and step S7 (switch to the assistance running or engine driving mode) in the flowchart of FIG. 3. FIG. 4 illustrates each of the driving mode, the state of the engine, and the rotational speed of the engine and the rotational speed of the electric motor responding to the engagement or disengagement of the clutch from the start of moving. As illustrated in FIG. 4, at time of the start of moving, the gear number is shifted into the 2nd and the electric motor driving mode is selected. Intrinsically, after a usual depression of the accelerator increases the rotational speed and the gear is shifted up into 3rd or 4th, the mode is switched to the engine driving mode or the assistance driving mode. However, even if the rotational speed is not increased and the electric motor driving mode is performed, the driving mode switch control is started at the time when it is determined that the accelerator opening amount is equal to or more than the predetermined value. In other words, the control of the synchronization of the rotational speeds of the engine 12 and the electric motor 13 (in step S3, referred to as the rotation synchronization) is started. When the rotational speed of the engine 12 is changed from the rotational speed during idling to almost the same speed as the rotational speed of the electric motor 13, the clutch 12 is engaged (step S5) and then the mode is switched to the assistance driving mode or the engine driving mode (step S7). As a result of that, the necessary power is transmitted to a tire 12.

Effects

According to the hybrid vehicle 1, when it is estimated that the driver's request torque exceeds the maximum torque of the electric motor 13, the driving mode is switched to the assistance driving mode or the engine driving mode even if the electric motor driving mode is performed. Thus, the torque corresponding to the request torque can be outputted. In other words, when the request torque exceeds the maximum torque of the electric motor 13, the torque can be complemented by the power of the engine 12. Thus, the electric motor 13 and a peripheral device such as the inverter 14 do not need a capability to generate the same amount of torque as the engine 10. This can reduce the size, weight, and cost of the electric motor 13 and a peripheral device such as the inverter 14.

Second Embodiment

A hybrid vehicle 1A according to the second embodiment of the present invention will be described with reference to the flowchart in FIG. 5 and the timing diagram in FIG. 6. The hybrid vehicle 1A has the same structure as the hybrid vehicle 1. The hybrid vehicle 1A will be described with reference signs in the same line (for example, the hybrid ECU 18A, or the rotational speed synchronization control unit 31A).

Before the mode is switched from the electric motor driving mode to the assistance driving mode or the engine driving mode, the rotational speed synchronization control unit 31A of the hybrid vehicle 1A controls the rotational speed of the engine to be larger than the rotational speed of the electric motor.

Note that, in the procedure of step S3, the above-mentioned hybrid vehicle 1 almost synchronizes the rotational speed of the engine and the rotational speed of the electric motor. However, a slight error occurs with the synchronization at that time. The range of the error includes an error in which the rotational speed of the engine deviates from the rotational speed of the electric motor in a plus direction and an error in which the rotational speed of the engine deviates from the rotational speed of the electric motor in a minus direction. The deviation cannot be fixed in one direction. On the other hand, the hybrid vehicle 1A controls the rotational speed of the engine to deviate from the rotational speed of the electric motor necessarily in a plus direction.

Figure 5:
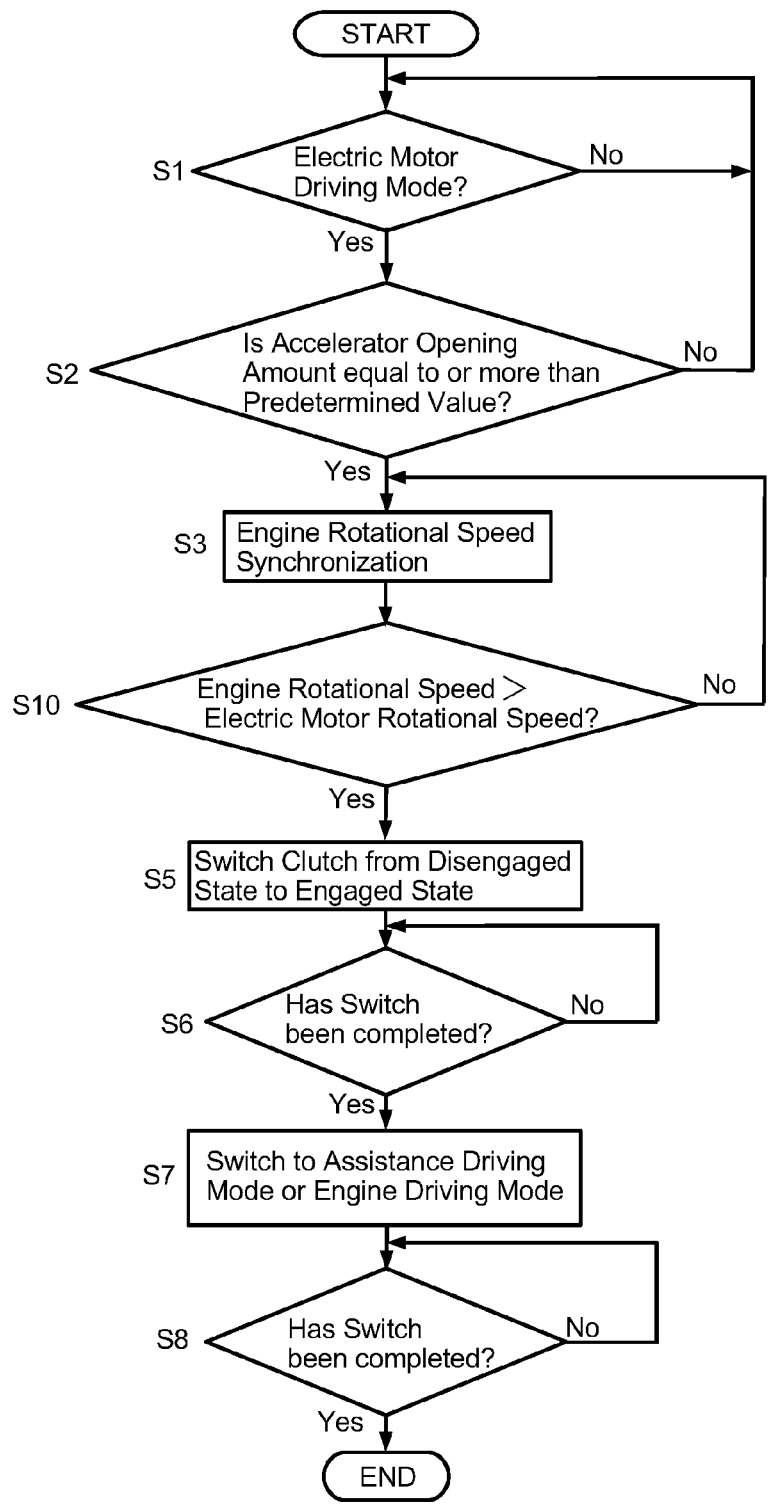
FIG. 5 is a flowchart for illustrating a mode switch process according to a second embodiment.

In the flowchart of FIG. 5, step S10 differs from the flowchart of FIG. 3 and the other steps are the same as the steps in FIG. 3. Hereinafter, a description of the procedures overlapping with the procedures in the flowchart of FIG. 3 will be omitted. In other words, when the request torque estimation unit 30A determines in step S2 that the accelerator opening amount is equal to or more than the predetermined value, the process goes to step S3.

In step S3, the rotational speed synchronization control unit 31A performs a control in order to almost synchronize the rotational speed of the engine 10 and the rotational speed of the electric motor 13. Note that, in that case, the control to increase the rotational speed of the engine 10 is performed until the rotational speed of the engine 10 becomes larger than the rotational speed of the electric motor 13.

After the rotational speed synchronization control unit 31A has increased the rotational speed of the engine 10 in step S3 until the rotational speed of the engine 10 becomes larger than the rotational speed of the electric motor 13, the process goes to step S10. In step S10, the rotational speed synchronization control unit 31A determines whether the rotational speed of the engine 10 is larger than the rotational speed of the electric motor 13 by a predetermined number (for example, $\Delta\alpha$ rpm).

When it is determined in step S10 that the rotational speed of the engine 10 is larger than the rotational speed of the electric motor 13 by the predetermined number (for example, $\Delta\alpha$ rpm), the process goes to step S5. On the other hand, when it is determined in step S10 that the rotational speed of the engine 10 is not larger than the rotational speed of the electric motor 13 by $\Delta\alpha$ rpm, the process goes back to step S3. The subsequent procedures are the same as the procedures in the description of FIG. 3.

Note that the above-mentioned $\Delta\alpha$ rpm is an example. Thus, the difference between the rotational speed of the engine 10 and the rotational speed of the electric motor 13 when the clutch 12 is engaged can variously be set in consideration of the drivability.

Figure 6:
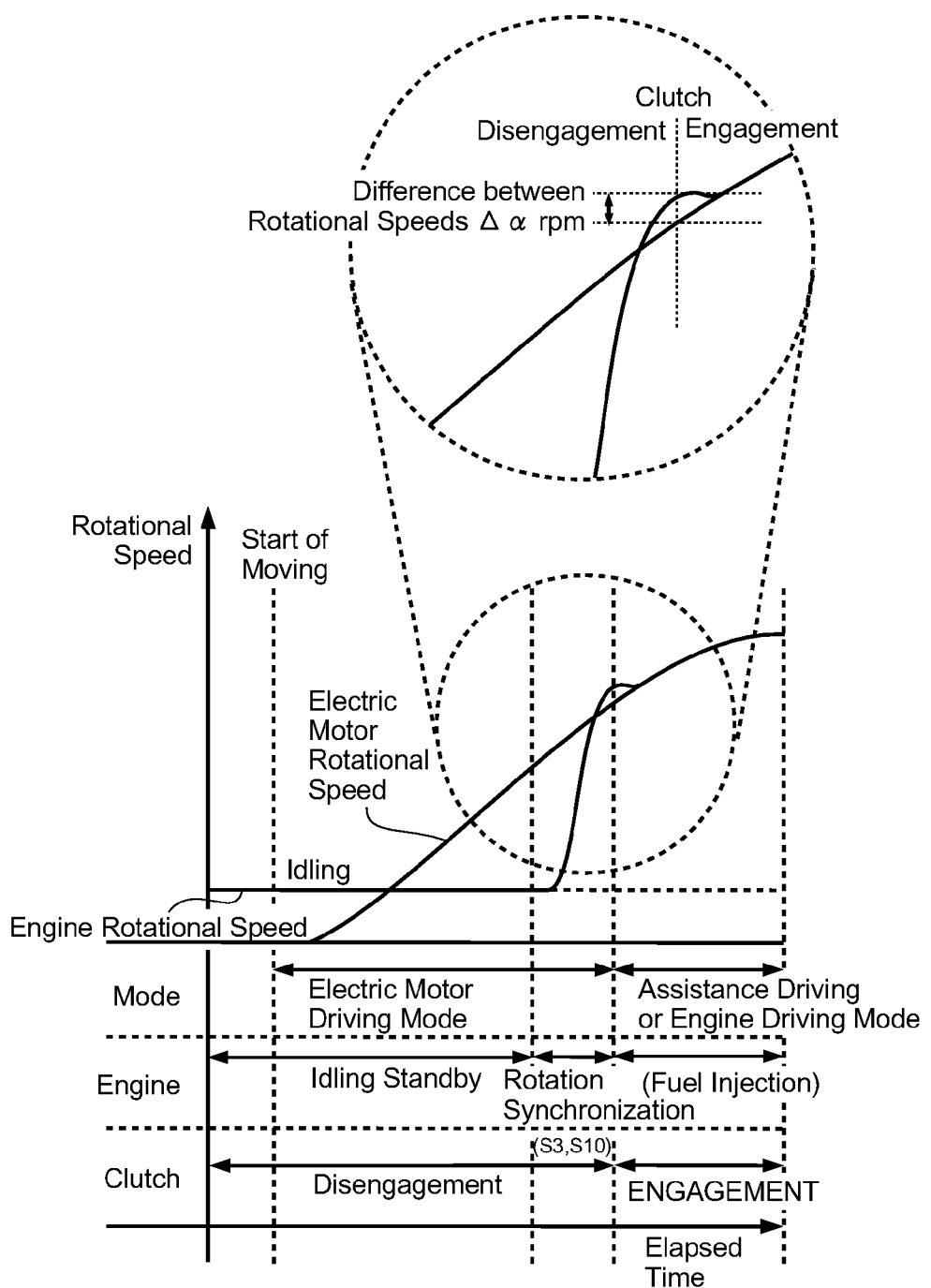
FIG. 6 is a timing diagram for illustrating the mode switch process according to the second embodiment.

The state in step S10 is illustrated in the circle drawn with a broken line in FIG. 6. The state in the upper circle in FIG. 6 is an enlarged and detailed state of the state in the lower circle. In the example in FIG. 6, the rotational speed of the engine deviates from the rotational speed of the electric motor by $\Delta\alpha$ rpm in a plus direction.

Effects

According to the hybrid vehicle 1A, the clutch 12 is shifted from the disengaged state to the engaged state when the rotational speed of the engine 10 is slightly larger than the rotational speed of the electric motor 13 (for example, by $\Delta\alpha$ rpm). Thus, there is not a feeling of deceleration of the hybrid vehicle 1A when the clutch 12 is engaged. This can improve the drivability.

Further, when the control to almost synchronize the rotational speed of the engine and the rotational speed of the electric motor, as described in the first embodiment, is compared with the control performed so that the rotational speed of the engine deviates from the rotational speed of the electric motor necessarily in a plus direction, as described in the second embodiment, the latter is better than the former because the latter has a larger margin of error than the former. In other words, when the rotational speed of the engine is slower than the rotational speed of the electric motor, the driver gets a great shock at the time when the clutch 12 is engaged. On the other hand, when the rotational speed of the engine is faster than the rotational speed of the electric motor, the driver gets a small shock at the time when the clutch 12 is engaged. This is caused because the friction of the engine 10 is larger than the friction of the electric motor 13. Further, it seems that the user does not get an uncomfortable feeling much with the shock of acceleration because the user strongly depresses the accelerator. Thus, the accuracy of the latter control can be lower than that of the former control. This can simplify the control of the hybrid ECU 18A.

Third Embodiment

A hybrid vehicle 1B according to the third embodiment of the present invention will be described with reference to the flowchart in FIG. 7 and the timing diagram in FIG. 8. The hybrid vehicle 1B has the same structure as the hybrid vehicle 1. The hybrid vehicle 1B will be described with reference signs in the same line (for example, the request torque estimation unit 30B, or the mode switch control unit 32B).

Even if the request torque does not reach the torque that requires the switch from the electric motor driving mode to the assistance driving mode, the mode switch control unit 32B of the hybrid vehicle 1B controls the mode switch in order to switch the mode from the electric motor driving mode to the assistance driving mode or the engine driving mode while the switch is timed for the next gear shifting timing (in other words, is timed for the timing of the change of the gear number).

Figure 7:
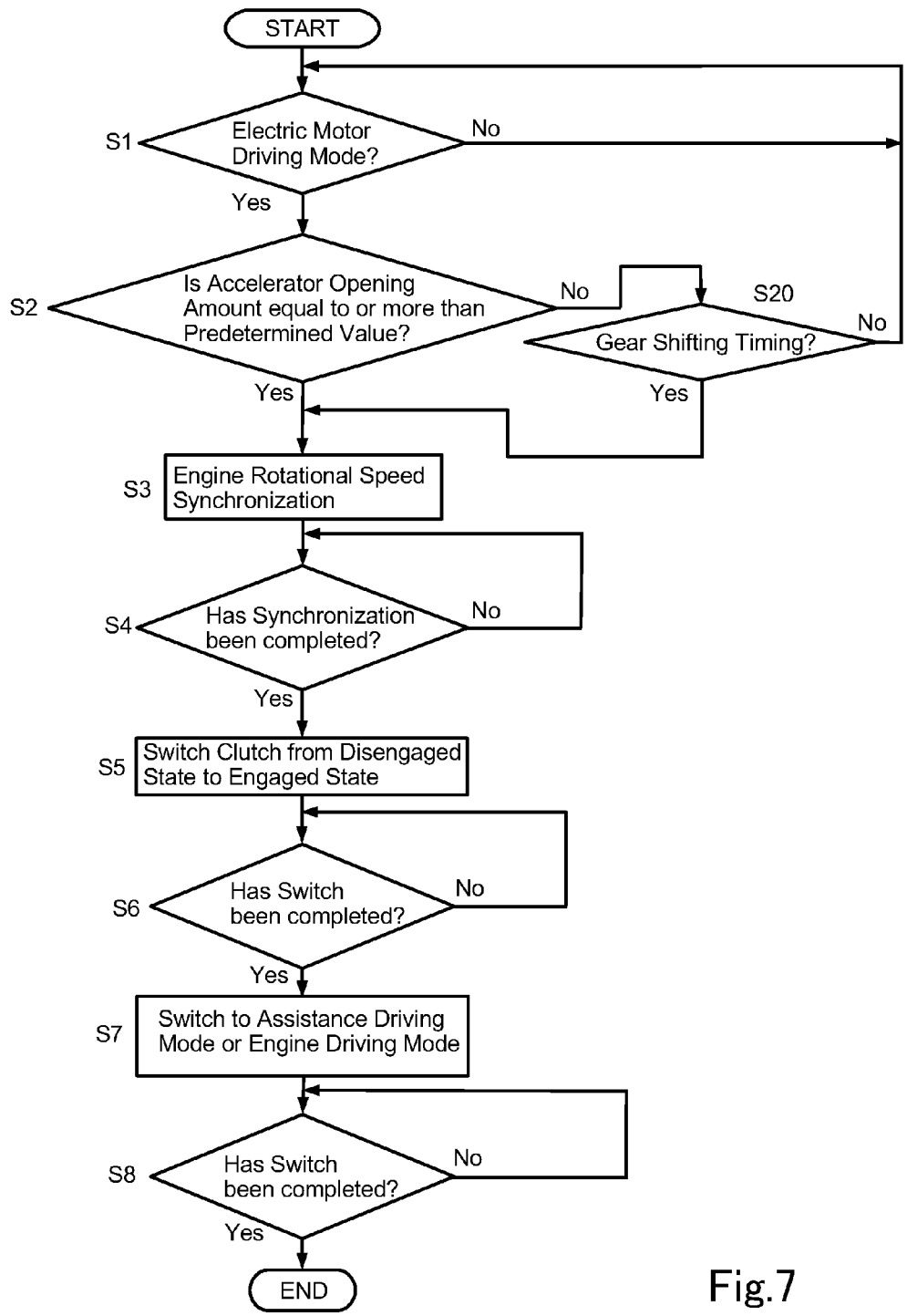
FIG. 7 is a flowchart for illustrating a mode switch process according to a third embodiment.

In the flowchart of FIG. 7, step S20 is added to the flowchart of FIG. 3 and the other steps are the same as the steps in FIG. 3. Hereinafter, a description of the procedures overlapping with the procedures in the flowchart of FIG. 3 will be omitted. In other words, when the request torque estimation unit 30B determines in step S2 that the accelerator opening amount is less than the predetermined value (or, namely, No in step S2), the process goes to step S20. On the other hand, when the request torque estimation unit 30B determines in step S2 that the accelerator opening amount is equal to or more than the predetermined value, the process goes to step S3 and the same process as in the flowchart of FIG. 3 are subsequently performed.

In step S20, the mode switch control unit 32B determines whether the present time is the time to shift gears (for example, the time when the rotational speed increases and the gear is shifted into the 3rd). When it is determined in step S20 that the present time is the time to shift gears, the process goes to step S3 and the same procedures as in the flowchart of FIG. 3 are subsequently performed. On the other hand, when it is determined in step S20 that the present time is not the time to shift gears, the process goes back to step S1.

Figure 8:
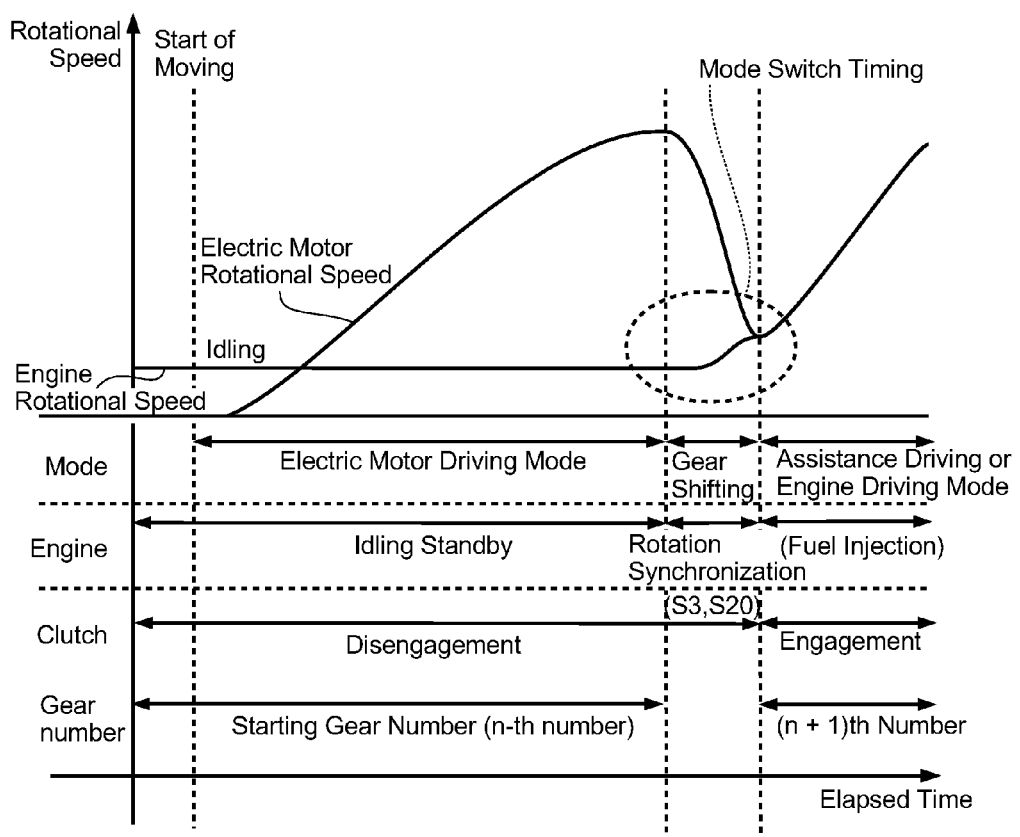
FIG. 8 is a timing diagram for illustrating the mode switch process according to the third embodiment.

The state in which the mode switch is performed at the gear shifting timing is illustrated in the ellipse drawn with a broken line in FIG. 8. It is found that only a slight increase in the rotational speed of the engine from the idling speed almost synchronizes the rotational speed of the engine with the rotational speed of the electric motor.

Further, instead of step S4 in FIG. 7, step S10 in FIG. 5 can be performed.

Effects

According to the hybrid vehicle 1B, even if the estimation result from the request torque estimation unit 30 does not exceed the maximum torque of the electric motor 13 during acceleration in the electric motor driving mode, the mode switch is performed at the next gear shifting timing.

As described above, even if the request torque does not reach the torque that requires the switch from the electric motor driving mode to the assistance driving mode, the mode switch is performed while timed for the gear shifting timing at a small rotational speed of the engine 10. This can avoid a mode switch during acceleration to be performed at the next gear number (in other words, except at the gear shifting timing).

Thus, only a slight increase in the rotational speed of the engine 10 from the standby state (idling state) is required to synchronize the electric motor 13 and the engine 10. This can reduce the shock at the time when the clutch 12 connects the engine 10 to the electric motor 13 and save the energy consumption.

Other Embodiments

In the above-mentioned embodiments, it is determined in the procedure of step S2 whether the accelerator opening amount is equal to or more than a predetermined value. However, instead of that, it can be determined whether the variation of the accelerator opening amount is equal to or more than a predetermined value. For example, when the variation of the accelerator opening amount is large, the request torque estimation unit 30 can determine that the driver performs a rapid accelerator operation and the driver requires a rapid acceleration, accordingly. Thus, the mode switch control unit 30 controls the mode switch in order to switch the mode from the electric motor driving mode to the engine driving mode.

In the second embodiment, the switch such as from the electric motor driving mode to the engine driving mode can be applied to the switch such as from the electric motor driving mode to the engine driving mode not only according to the accelerator opening amount but also according to another condition. For example, the decrease in the SOC of the battery 15 can cause the switch such as from the electric motor driving mode to the engine driving mode.

Further, the boundaries of the regions for determination can variously be changed, for example, the "equal to or more than" can be changed into "exceeds" and the "less than" can be changed into "equal to or less than" in the description of the above-mentioned flowchart.

Although the engine 10 has been described as an internal combustion engine, the engine 10 can also be a heat engine including an external combustion engine.

Further, while the computer program executed by the hybrid ECU 18, 18A, or 18B is installed on the hybrid ECU 18, 18A, or 18B in advance in the above-mentioned descriptions, the computer program can be installed on the hybrid ECU 18, 18A, or 18B as a computer by attaching removable media recording the computer program (storing the program), for example, to a drive (not shown in the drawings) and storing the computer program read from the removable media in a non-volatile memory inside the hybrid ECU 18, 18A, or 18B, or receiving, with a communication unit (not shown in the drawings), a computer program transmitted through a wired or wireless transmission medium and storing the computer program in a non-volatile memory inside the hybrid ECU 18, 18A, or 18B.

Further, each ECU can be implemented by an ECU combining some or all of the functions of the ECUs. Alternatively, an ECU can newly be provided by the further subdivision of the function of each ECU.

Note that the computer program executed by the computer can be for performing the process in chronological order according to the order described herein or can be for performing the process in parallel or at the necessary timing, for example, when the computer program is invoked.

Further, the embodiments of the present invention are not limited to the above-mentioned embodiments, and can variously be modified without departing from the gist of the invention.

The invention claimed is:

1. A driving mode switch control device of a hybrid vehicle that includes an engine and an electric motor and the hybrid vehicle is capable of running by the engine or the electric motor or a cooperation between the engine and the electric motor, the driving mode switch control device comprising:
   an ECU configured to perform functions of a request torque estimation unit, a rotational speed synchronization control unit, and a mode switch control unit;
   the request torque estimation unit for estimating request torque based on a driver's accelerator operation, wherein an estimation result from the request torque estimation unit exceeds a maximum torque of the electric motor when the hybrid vehicle is in a driving mode with the electric motor;
   the rotation speed synchronization control unit for determining whether a rotation speed of the engine synchronizes a rotation speed of the electric motor;
   the mode switch control unit for, when the request torque estimation unit determines that the estimation result exceeds maximum torque of the electric motor and the mode switch control unit determines that a predetermined next gear shifting timing is met when only a slight increase in the rotational speed of the engine from an engine idling speed almost synchronizes the rotation speed of the electric motor, performing a mode switch from an electric motor driving mode with the electric motor to an engine driving mode in which the hybrid vehicle runs with the engine or an assistance driving mode in which the hybrid vehicle runs by the cooperation between the engine and the electric motor.

2. The driving mode switch control device according to claim 1, wherein the mode switch control unit performs the mode switch at the predetermined next gear shifting timing in the electric motor driving mode with the electric motor when the estimation result from the request torque estimation unit does not exceed the maximum torque of the electric motor when the hybrid vehicle is accelerated.

3. The driving mode switch control device according to claim 1, wherein the mode switch control unit controls the rotational speed of the engine to be faster than the rotational speed of the electric motor when performing the mode switch from the electric motor driving mode with the electric motor to the assistance driving mode in which the hybrid vehicle runs with the engine or by the cooperation between the engine and the electric motor.

4. The driving mode switch control device according to claim 1, wherein the request torque estimation unit determines whether a variation of accelerator opening amount according to the driver's accelerator operation or the accelerator opening amount exceeds a predetermined value.

5. A driving mode switch control method implemented by a driving mode switch control device of a hybrid vehicle that includes an engine and an electric motor and the hybrid vehicle is capable of running by the engine or the electric motor or a cooperation between the engine and the electric motor, the driving mode switch control device comprising an ECU configured to perform functions of a request torque estimation unit, a rotational speed synchronization control unit, and a mode switch control unit, the driving mode switch control method comprising:
   a request torque estimation step for estimating, by the request torque estimation unit, request torque based on a driver's accelerator operation;
   a determination step for determining, by the rotational speed synchronization control unit, whether a rotation speed of the engine synchronizes a rotation speed of the electric motor, wherein an estimation result from the request torque estimation step exceeds maximum torque of the electric motor when the hybrid vehicle is in a driving mode with the electric motor;
   a mode switch step for, when the determination step determines that the estimation result from the request torque estimation step exceeds maximum torque of the electric motor and a mode switch control unit determines that a predetermined next gear shifting timing is met when only a slight increase in the rotational speed of the engine from an engine idling speed almost synchronizes the rotation speed of the electric motor, performing, by the mode switch control unit, a mode switch from an electric motor driving mode with the electric motor to an engine driving mode in which the hybrid vehicle runs with the engine or an assistance driving mode in which the hybrid vehicle runs by the cooperation between the engine and the electric motor.

* * * * *